United States Patent
Kramer

[11] Patent Number: 6,036,198
[45] Date of Patent: Mar. 14, 2000

[54] COUPLING FOR ATTACHING A TOOL TO A CHUCK

[76] Inventor: Hy Kramer, 50 Carter Dr., Stamford, Conn. 06902

[21] Appl. No.: 09/283,206

[22] Filed: Apr. 1, 1999

[51] Int. Cl.[7] .................................................. B23H 1/04
[52] U.S. Cl. ........................ 279/133; 219/69.15; 403/13; 403/354; 409/234
[58] Field of Search .................................. 279/133, 23.1, 279/905, 906; 403/13, 14, 354, 364, 375; 219/69.15; 409/234

[56] References Cited

U.S. PATENT DOCUMENTS

| | | | |
|---|---|---|---|
| 4,621,960 | 11/1986 | Tollner | 409/234 |
| 4,855,558 | 8/1989 | Ramsbro | 279/4.06 |
| 5,634,757 | 6/1997 | Schanz | 403/354 |
| 5,791,803 | 8/1998 | Nordquist | 219/69.15 |
| 5,906,378 | 5/1999 | Nordquist | 279/4.06 |

Primary Examiner—Steven C. Bishop

[57] ABSTRACT

A coupling for attaching a tool to a chuck includes a steel body substantially in the shape of a rectangular prism. The body includes an electrode end for attachment to an electric discharge machine electrode. The body also includes a chuck end opposite the electrode end for releasable attachment to a chuck mounted to an electric discharge machine, the chuck having four protrusions extending therefrom for alignment of the coupling relative to the chuck. The chuck end defines a substantially planar surface and four substantially rectangular channels for receiving the protrusions. The channels extend into the body from the surface and are arranged in a substantially X-shaped pattern. Each channel includes two outwardly elastically moveable side walls. Each channel also includes an slot adjacent and parallel to each side wall for enabling outward movement of the side wall. Each slot extends into the body from the surface.

16 Claims, 4 Drawing Sheets

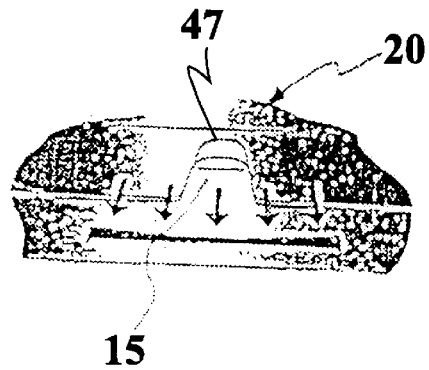
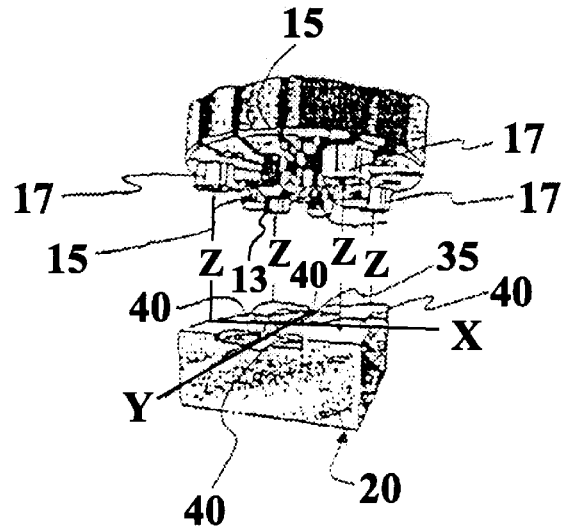
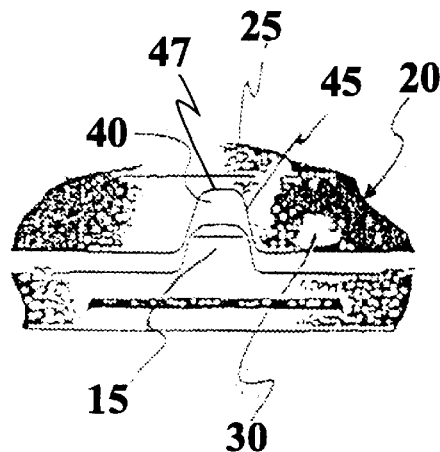
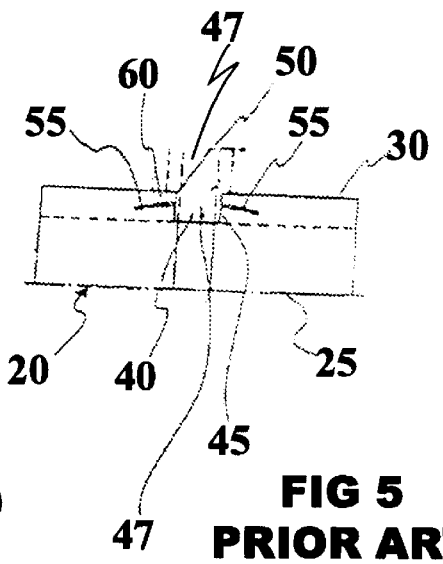
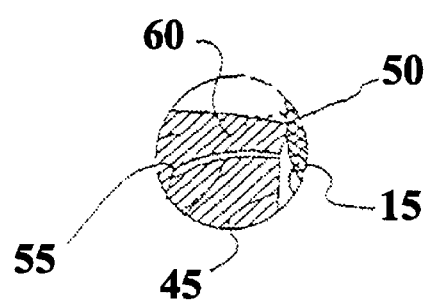

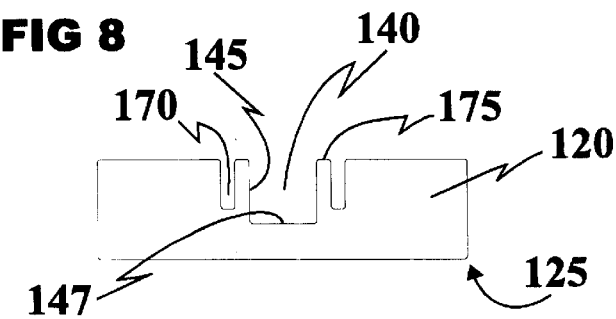
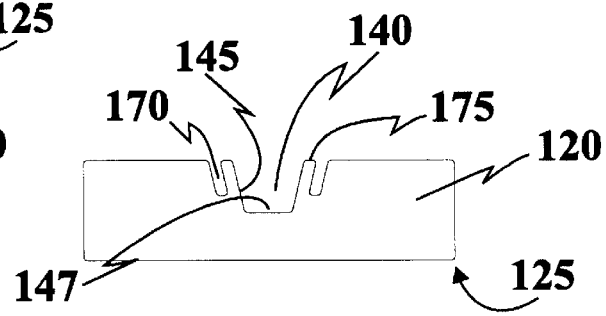
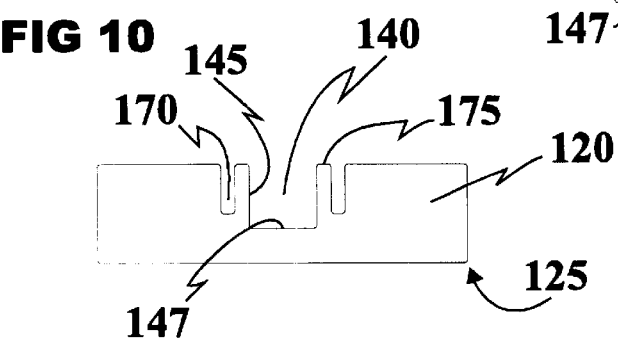
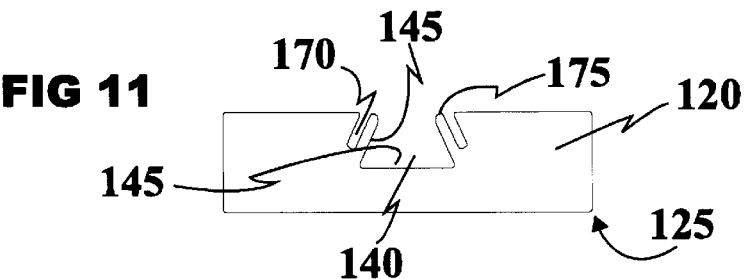
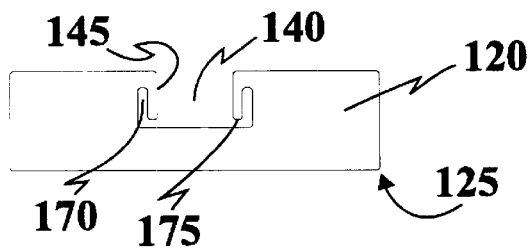
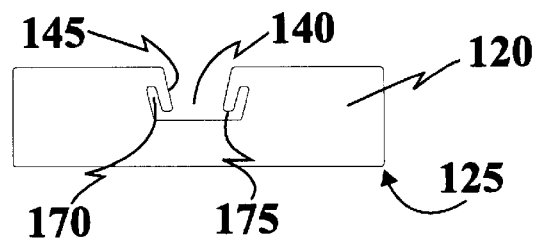

COUPLING FOR ATTACHING A TOOL TO A CHUCK

FIELD OF INVENTION

The present invention relates to a coupling for attaching a tool to a chuck. In particular, the present invention relates to a coupling for releasably attaching a tool to a chuck having at least one protrusion extending therefrom for alignment of the coupling relative to the chuck.

BACKGROUND OF THE INVENTION

An electric discharge machine uses an electrode to machine a workpiece by spark erosion. The size and design of electrode used depends on the particular task at hand. It is therefore important to be able to remove and replace electrodes.

It is known to attach an electrode to an electrode coupling. The electrode coupling is designed so that it may be repeatedly attached to and removed from a chuck mounted on an electric discharge machine. The electrode coupling is thus securely yet releasably attachable to the chuck. Chucks and electrode couplings are generally constructed of a strong elastic material such as steel.

FIG. 1 illustrates a known design of chuck 5. The chuck 5 includes a surface 10. For illustrative purposes, x-, y- and z-axes are indicated on FIG. 1. The x-y plane is defined by the surface 10, and the origin of the x-y-z axes is centrally located on the surface 10.

It is important that an electrode be positioned accurately relative to a chuck in both the x- and y-directions. Accordingly, the illustrated chuck 5 includes four spaced apart eccentric protrusions 15 designed to engage corresponding orifices in an electrode coupling. Other known designs of chuck may include more or fewer protrusions, or may include protrusions of different sizes and shapes. The protrusions 15 should be accurately machined in order to ensure that an electrode coupling may be positioned precisely relative to the chuck 5 in the x- and y-directions.

FIGS. 2 and 3 illustrate a first prior art design of electrode coupling 20, and FIGS. 4, 5 and 6 illustrate a second prior art design of electrode coupling 20. With respect to each prior art design, the electrode coupling 20 includes an electrode end 25 to which an electrode may be attached, and a chuck end 30 designed to engage the chuck 6. The coupling 20 includes a centrally located hole 35, and four channels 40 arranged in a substantially X-shaped pattern. The channels 40 are, in fact, arranged in a cross-shaped pattern. For the purposes of the present application, a cross-shaped pattern is considered to be a special case of a substantially X-shaped pattern. An X-shaped pattern includes a cross-shaped pattern, which is a pair of collinear channels perpendicular to another pair of collinear channels. The channels 40 are designed to receive the protrusions 15 such that each protrusion 15 is securely yet releasably held by its corresponding channel 40. Thus, to replace one electrode with another, the electrode coupling 20 is removed from the chuck 5, thereby removing the protrusions 15 from the channels 40. The electrode coupling 20 is then replaced by another electrode coupling 20 to which is attached a different electrode or, alternatively, a different electrode is attached to the same electrode coupling 20 which is then reattached to the chuck 5.

The channels 40 illustrated in FIGS. 2 and 3 are rectangular in cross section, each including two side walls 45 and a floor 47. The distance between the side walls 45 of each channel 40 is such that there is an interference fit between the protrusions 15 and the channels 40. As the electrode coupling 20 is constructed of steel, and as there is an interference fit between the protrusions 15 and the channels 40, the side walls 45 deform elastically at least in the x- and y-directions upon the insertion of the protrusions 15. The side walls are therefore elastically deformable. The forceful interaction between the protrusions 15 and the side walls 45 causes the protrusions 15 to be held securely yet releasably within the channels 40. The electrode coupling 20 is thus securely yet releasably attachable to the chuck 5. However, the contact between the side walls 45 and the protrusions 15 leads to wear of the side walls 45 and the protrusions 15. Such wear, in turn, leads to less accurate positioning of the electrode relative to the chuck 5 in the x- and y-directions, and to less secure attachment of the electrode coupling 20 to the chuck 5.

FIGS. 4, 5 and 6 illustrate a further prior art design of channel 40, which is disclosed in U.S. Pat. No. 4,855,558 to Ramsbro. Referring to FIGS. 4 and 5 in particular, each illustrated channel 40 is rectangular in cross section and includes two side walls 45 having leading edges 50, and a floor 47. Into each side wall 45 extends a recess 55 which runs along the length of the side wall 45. The recesses 55, which curve slightly downward, extend substantially horizontally into the body of the electrode coupling 20. Each recess 55 creates a substantially horizontally oriented lip 60. As the illustrated electrode coupling 20 is constructed of steel, the lips 60 may be elastically bent downward, i.e. essentially in the z-direction, as indicated by the broken line in FIG. 6.

The distance between the side walls 45 is such that there is an interference fit between the protrusions 15 and the channels 40. FIG. 6 illustrates a protrusion 15 inserted into the channel 40 of FIGS. 4 and 5. As there is an interference fit between the protrusion 15 and the channel 40, the protrusion 15 contacts and exerts force on the leading edges 50 of the side wall 40, thus bending the lips 60 downward, and possibly deforming the side walls 45 elastically in the x- and y-directions. The side walls 45 are therefore elastically deformable and downwardly elastically moveable. The forceful interaction between the protrusions 15 and the side walls 45, and particularly the contact between the edges 50 and the protrusions 15, causes the protrusions 15 to be held securely yet releasably within the channels 40. The electrode coupling 20 is thus securely yet releasably attachable to the chuck 5. However, the contact between the side walls 45 and the protrusions 15, and particularly the contact between the edges 50 and the protrusions 15, leads to wear and damage of the side walls 35, at least on the edges 50, and of the protrusions 15. Such wear, in turn, leads to less accurate positioning of the electrode relative to the chuck 5 in the x- and y-directions, and to less secure attachment of the electrode coupling 20 to the chuck 5.

The above discussion refers to the importance of positioning the electrode coupling 20 accurately relative to the chuck 5 in both the x- and y-directions. Note, however, that it is also important to position an electrode coupling 20 accurately relative to the chuck 5 in the z-direction. It is known to design the electrode coupling 20 such that a portion of the electrode coupling 20 contacts the surface 10 of the chuck 5, or a post 17 (see FIG. 4) on the surface 10, when the electrode coupling 20 is the required distance from the chuck S. In such designs, the protrusions 15 do not contact the floors 47 of the channels 40.

The above discussion refers to the attachment of electrodes to a chuck mounted on an electric discharge machine.

It is similarly necessary to attach other tools to chucks mounted on other types of machines.

SUMMARY OF THE INVENTION

An object of the present invention is to provide an improved coupling for attaching a tool to a chuck.

According to the invention, there is provided a coupling including a body. The body includes a tool end for attachment to a tool. The body also includes a chuck end for releasable attachment to a chuck having a protrusion extending therefrom for alignment of the coupling relative to the chuck. The chuck end defines a primary orifice for receiving the protrusion. The primary orifice includes an elastically moveable side wall.

According to one aspect of the invention, there is provided a coupling including a steel body substantially in the shape of a rectangular prism. The body includes an electrode end for attachment to an electric discharge machine electrode. The body also includes a chuck end opposite the electrode end for releasable attachment to a chuck mounted to an electric discharge machine, the chuck having four protrusions extending therefrom for alignment of the coupling relative to the chuck. The chuck end defines a substantially planar surface. The chuck end also defines four substantially rectangular channels for receiving the protrusions. The channels extend into the body from the surface and are arranged in a different substantially X-shaped pattern. Each channel includes two elastically moveable side walls. Each channel also includes a slot adjacent and parallel to each side wall for enabling movement of the side wall, which is in effect a free standing spring. Each slot extends into the body from the surface.

Advantageously, the invention provides an improved coupling for attaching a tool to a chuck. The coupling is securely yet releasably attachable to a chuck and avoids unnecessary wear on the electrode coupling and the chuck.

Other advantages and features of the present invention will be readily apparent to those skilled in the art from a review of the following detailed description of preferred embodiments in conjunction with the accompanying drawings and claims.

BRIEF DESCRIPTION OF THE DRAWINGS

Embodiments of the invention will now be described with reference to the accompanying drawings, in which:

FIG. 2 is a side elevation view of a first prior art electrode coupling disengaged from a chuck;

FIG. 3 is a side elevation view of the electrode coupling of FIG. 2 engaging the chuck;

FIG. 4 is a perspective view of a second prior art electrode coupling disengaged from a chuck;

FIG. 5 is a side elevation view of the electrode coupling of FIG. 4;

FIG. 6 is a cross-sectional detail view of a portion of the electrode coupling of FIG. 4 and a chuck protrusion;

FIG. 8 is a side elevation view of the embodiment of FIG. 7;

FIG. 9 is a side elevation view of a further embodiment of the present invention;

FIG. 10 is a side elevation view of a further embodiment of the present invention;

FIG. 11 is a side elevation view of a further embodiment of the present invention;

FIG. 12 is a side elevation view of a further embodiment of the present invention;

FIG. 13 is a side elevation view of a further embodiment of the present invention.

DETAILED DESCRIPTION OF THE EMBODIMENTS

Figure 1:
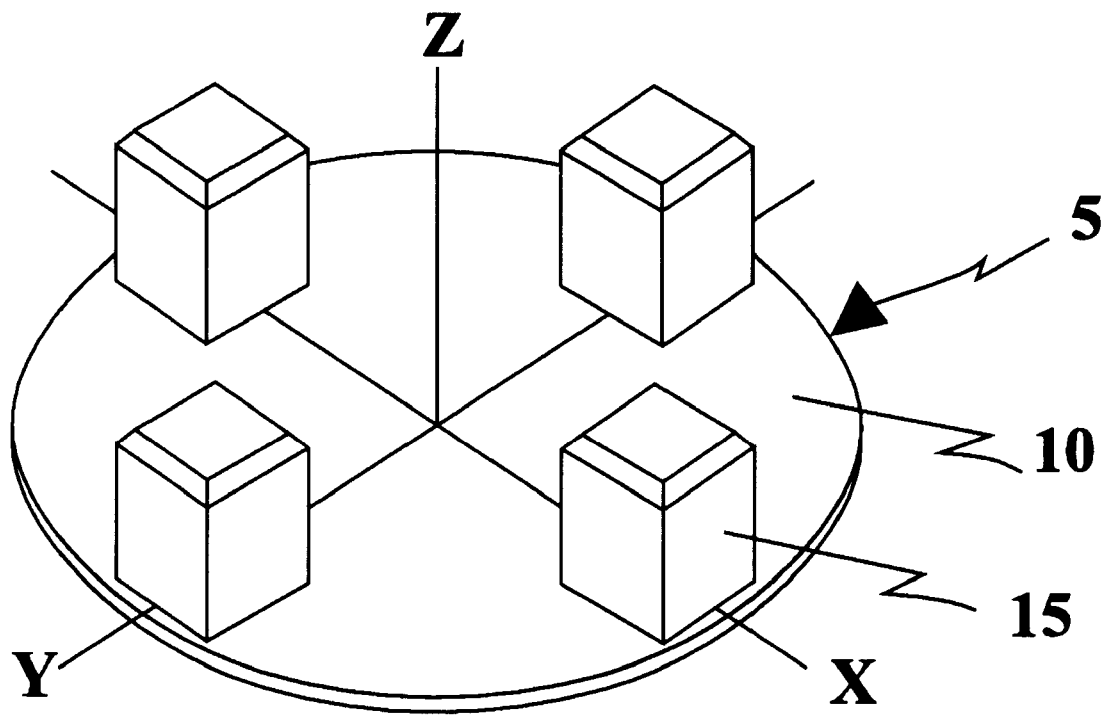
FIG. 1 is a perspective view of a known design of chuck for an electric discharge machine.

FIGS. 7 to 13 illustrate some electrode couplings embodying the present invention. The illustrated electrode couplings 120 are designed so that they may be repeatedly attached to and removed from a chuck 5, such as that shown in FIG. 1, mounted on an electric discharge machine. The electrode couplings 120 embodying the present invention are thus securely yet releasably attachable to a chuck mounted on the electric discharge machine. The illustrated embodiments are constructed of steel, in part because of the strength and elasticity of steel. Other strong and elastic materials could be used.

Figure 7:
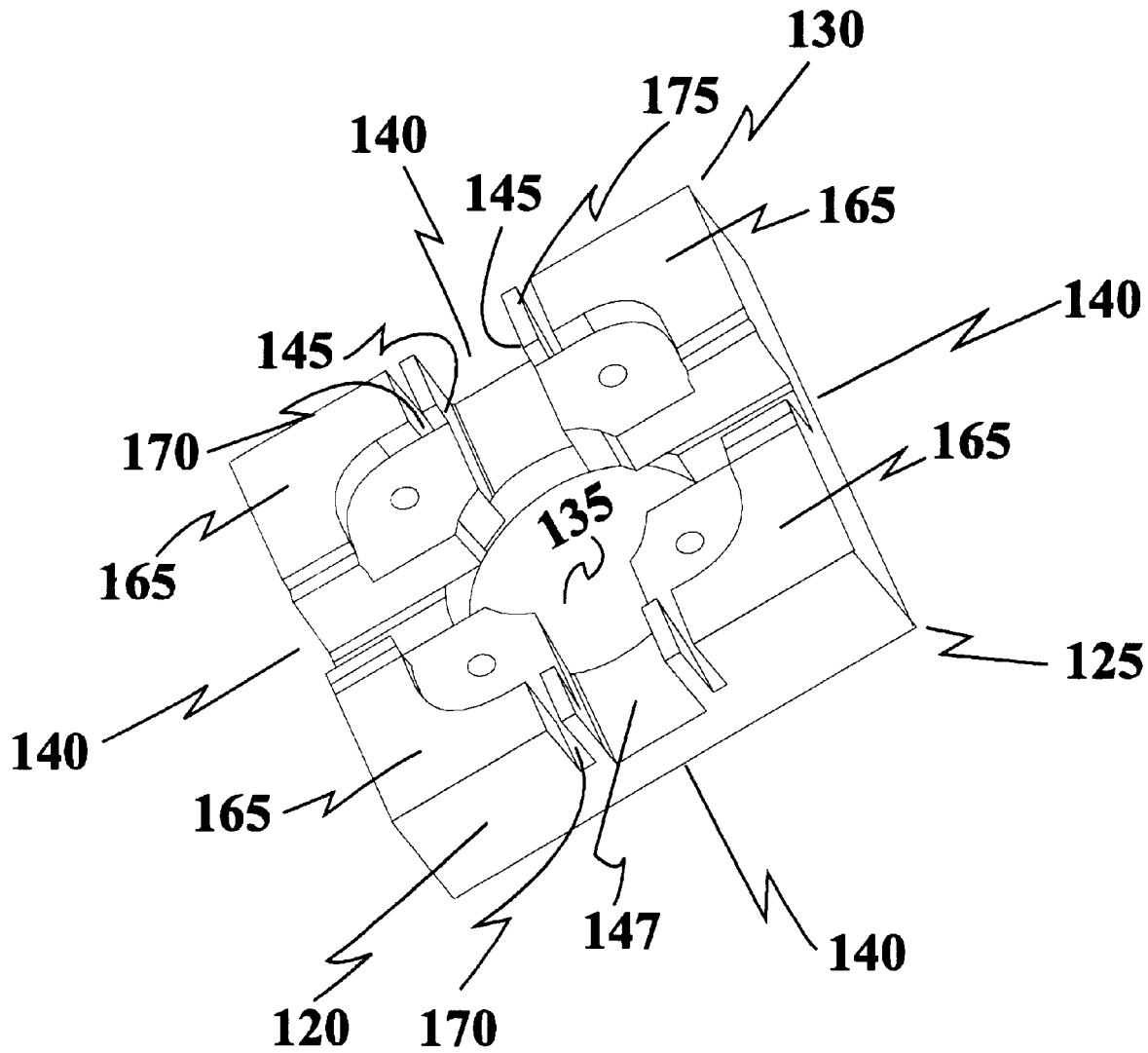
FIG. 7 is a perspective view of an embodiment of the electrode coupling of the present invention.

Referring specifically to the embodiment illustrated in FIGS. 7 and 8, an electrode coupling 120 includes an electrode end 125, to which an electrode may be attached, and a chuck end 130 designed to engage the chuck 5. The coupling 120 includes a centrally located hole 135, and four channels 140 arranged in a substantially X-shaped pattern that divides the surface of the chuck end 130 into four upper surfaces 165.

Each channel 140 is rectangular in cross section and includes two side walls 145 and a floor 147. Extending from each upper surface 165 into the body of the electrode coupling 120 is a slot 170 that runs parallel to the side wall 145. As each slot 170 runs the entire length of its corresponding side wall 145, each side wall 145 and corresponding slot 170 define a spring 175. As the electrode coupling 120 is constructed of steel, the spring 175 may be elastically bent or moved, i.e. essentially in the x- or y-directions. The spring 175 may be characterized as a free standing leaf spring.

The distance between the side walls 145 is such that there is an interference fit between the protrusions 15 and the channels 140. As there is an interference fit between the protrusion 15 and the channel 140, the protrusion 15 contacts and exerts force on the side wall 145, thus bending the springs 175. By virtue of the elasticity of the steel of which the electrode coupling 120 is made, the spring 175, and thus the side wall 145, exerts force on the protrusion 15. In addition, the force exerted by the side wall 145 on the protrusion 15 may deform the side wall 145 elastically. The side walls 145 are therefore elastically moveable and elastically deformable.

The total force exerted by a particular side wall 145 of an electrode coupling 120 embodying the present invention on a protrusion 15 is equal to the force exerted by the spring 175 plus the force exerted by a possibly elastically deformed side wall 145. The force exerted by the spring 175 is attributable to the fact that the side wall 145 is elastically moveable. The remainder of the force exerted by the side wall 145 is attributable to the elastic properties of the steel at the side wall 145.

Referring back to the prior art electrode coupling of FIGS. 2 and 3, the force exerted by a particular side wall 45 on a protrusion 15 is attributable solely to the elastic properties of the steel at the side wall 45. Consequently, the wear on the side walls 45 and protrusions 15 is greater than the wear on side walls 145 of electrode couplings 120 embodying the present invention. In summary: the prior art side walls 45 are elastically deformable; the side walls 145 of the present invention are elastically moveable and elastically deformable; therefore the side walls 145 of the present invention experience less wear, and cause less wear on protrusions 15, than the prior art side walls 45 of FIGS. 2 and 3.

Referring back to the prior art electrode coupling 20 of FIGS. 4, 5 and 6, the total force exerted by a particular side wall 45 is equal to the force exerted by the lip 60 plus the force exerted by a possibly elastically deformed side wall 45. The force exerted by the lip 60 is attributable to the fact that the side wall 45 is downwardly elastically moveable. The remainder of the force exerted by the side wall 45 is attributable to the elastic properties of the steel at the side wall 45. However, the fact that the lip 60 is downwardly moveable causes the force exerted by the side wall 45 to be concentrated at the leading edges 50. Consequently, the wear on the side walls 45 and protrusions 15 is greater than the wear on side walls 145 of electrode couplings 120 embodying the present invention. In summary: the prior art side walls 45 are downwardly elastically moveable and elastically deformable; the side walls 145 of the present invention are elastically moveable and elastically deformable; therefore the side walls 145 of the present invention experience less wear, and cause less wear on protrusions 15, than the prior art side walls 45 of FIGS. 4, 5 and 6.

In operation, the channels 140 of an electrode coupling 120 embodying the present invention are designed to receive the protrusions 15 such that each protrusion 15 is securely yet releasably held by its corresponding channel 140. To replace one electrode with another, the electrode coupling 120 is removed from the chuck 5, thereby removing the protrusions 15 from the channels 140. The electrode coupling 120 is then replaced by another electrode coupling 120 to which is attached a different electrode or, alternatively, a different electrode is attached to the same electrode coupling 120 which is then reattached to the chuck 5. The invention provides an improved electrode coupling for an electric discharge machine. The electrode coupling 120 is securely yet releasably attachable to the chuck 5 and avoids unnecessary wear on the electrode coupling and the chuck.

FIGS. 9 to 13 illustrate some alternative designs of electrode couplings 20 embodying the present invention.

Numerous modifications, variations and adaptations may be made to the particular embodiments of the invention described above without departing from the scope of the invention, which is defined in the claims.

I claim:

1. A coupling comprising:
    a body comprising:
        a tool end for attachment to a tool; and
        a chuck end for releasable attachment to a chuck having a protrusion extending therefrom for alignment of the coupling relative to the chuck;
        the chuck end defining a primary orifice for receiving the protrusion, the primary orifice comprising a free standing, generally vertically extending, elastically moveable side wall.

2. A coupling as defined in claim 1, further comprising a secondary orifice adjacent the primary orifice for enabling outward movement of the outwardly elastically moveable side wall.

3. A coupling as defined in claim 2, wherein the primary orifice is a channel.

4. A coupling as defined in claim 3, wherein the secondary orifice is a slot.

5. A coupling as defined in claim 1, wherein the body is constructed of steel.

6. A coupling comprising:
    a body comprising:
        a tool end for attachment to a tool; and
        a chuck end for releasable attachment to a chuck having two protrusions extending therefrom for alignment of the coupling relative to the chuck;
        the chuck end defining two non-parallel channels for receiving the protrusions, each channel comprising a free standing, generally vertically extending, elastically moveable side wall.

7. A coupling as defined in claim 6, further comprising a secondary orifice adjacent each outwardly elastically moveable side wall for enabling outward movement of the outwardly elastically moveable side wall.

8. A coupling as defined in claim 7, wherein the secondary orifices are slots.

9. A coupling as defined in claim 6, wherein the body is constructed of steel.

10. A coupling comprising:
    a body comprising:
        a tool end for attachment to a tool; and
        a chuck end opposite the tool end for releasable attachment to a chuck having four protrusions extending therefrom for alignment of the coupling relative to the chuck;
        the chuck end defining:
            a surface;
            four substantially rectangular channels for receiving the protrusions, the channels extending into the body from the surface and being arranged in a substantially X-shaped pattern, each channel comprising a free standing, generally vertically extending, elastically moveable side wall; and
            a slot adjacent and parallel to each side wall for enabling outward movement of the side wall, each slot extending into the body from the surface.

11. A coupling as defined in claim 10, wherein each channel comprises two outwardly elastically moveable side walls.

12. A coupling as defined in claim 10, wherein the body is constructed of steel.

13. A coupling as defined in claim 10, wherein the body is substantially in the shape of a rectangular prism.

14. A coupling as defined in claim 10, wherein the surface is substantially planar.

15. A coupling as defined in claim 10, wherein the channels are arranged in a substantially cross-shaped pattern.

16. A coupling comprising:
    a steel body substantially in the shape of a rectangular prism, the body comprising:
        an electrode end for attachment to an electric discharge machine electrode; and
        a chuck end opposite the electrode end for releasable attachment to a chuck mounted to an electric discharge machine, the chuck having four protrusions extending therefrom for alignment of the coupling relative to the chuck;

the chuck end defining:

a substantially planar surface;

four substantially rectangular channels for receiving the protrusions, the channels extending into the body from the surface and being arranged in a substantially cross-shaped pattern, each channel comprising two free standing, generally vertically extending, elastically moveable side walls; and a slot adjacent and parallel to each side wall for enabling outward movement of the side wall, each slot extending into the body from the surface.

* * * * *